United States Patent [19]

Rath

[11] 3,730,306

[45] May 1, 1973

[54] DISC BRAKE CALIPER AND CIRCUIT SYSTEM

[75] Inventor: Heinrich Bernhard Rath, Birmingham, England

[73] Assignee: Girling Limited, Tysely, Birmingham, England

[22] Filed: Feb. 25, 1971

[21] Appl. No.: 118,961

Related U.S. Application Data

[62] Division of Ser. No. 808,066, March 18, 1969, abandoned.

[30] Foreign Application Priority Data

Apr. 6, 1968 Great Britain.....................16,635/68

[52] U.S. Cl...............188/345, 60/54.6 M, 188/72.5, 188/370
[51] Int. Cl..............................................B60t 11/16
[58] Field of Search .................188/72.5, 345, 106 P, 188/370; 60/54.6 E, 54.6 M

[56] References Cited

UNITED STATES PATENTS

| 3,261,429 | 7/1966 | Burnett et al.........................188/72.5 |
|---|---|---|
| 3,478,847 | 11/1969 | Bender et al..........................188/345 |

FOREIGN PATENTS OR APPLICATIONS

| 227,118 | 4/1958 | Australia..............................188/72.5 |
|---|---|---|
| 1,070,311 | 6/1967 | Great Britain.........................188/345 |

*Primary Examiner*—George E. A. Halvosa
*Attorney*—Scrivener, Parker, Scrivener & Clarke

[57] ABSTRACT

A vehicle disc brake comprising a caliper structure formed in two opposed halves a bridge portion straddling the disc and having a central bridge section and two side bridge sections, each of which defines with said central section a pad inspection window in said bridge portion. Two side-by-side pistons and cylinders in each caliper half are each aligned with an opposed cylinder in the other caliper half. Passage means interconnect two cylinders of each opposed pair, one said passage means extending through the central bridge section and the other passage means extending through one of the side bridge sections.

3 Claims, 4 Drawing Figures

DISC BRAKE CALIPER AND CIRCUIT SYSTEM

This is a division of application Ser. No. 808,066 filed Mar. 18, 1969, now abandoned.

This invention relates to vehicle disc brakes of the kind comprising a fixed caliper structure formed in opposed halves secured together along a joint plane parallel with that of the disc and lying in a bridge portion of the caliper structure which straddles the disc, each caliper half being formed with guide surfaces, extending perpendicular to the plane of the disc, for one of a pair of opposed brake pads.

The bridge portion of the caliper structure is formed with two side sections and a central section defining spaced apart windows allowing inspection of the pads, Fastening means pass through the side bridge sections and the pad guiding surfaces lie in planes which are parallel to one another and are each aligned with one of the said windows, whereby the pad guiding surfaces and the jointing surface of each caliper half can be machined in a single rectilinear cutting stroke. Hydraulic cylinders are arranged in two opposed pairs in the caliper halves (the actuation of either pair being sufficient to move the pads into engagement with the brake disc) and the two pairs are connected into two separate and independently operated groups of opposed actuators. The cylinders of each pair, lying on opposite sides of the caliper, are interconnected by internal drilling passing across two bridge sections.

With reference now to the accompanying drawings, in which.

Figure 1:
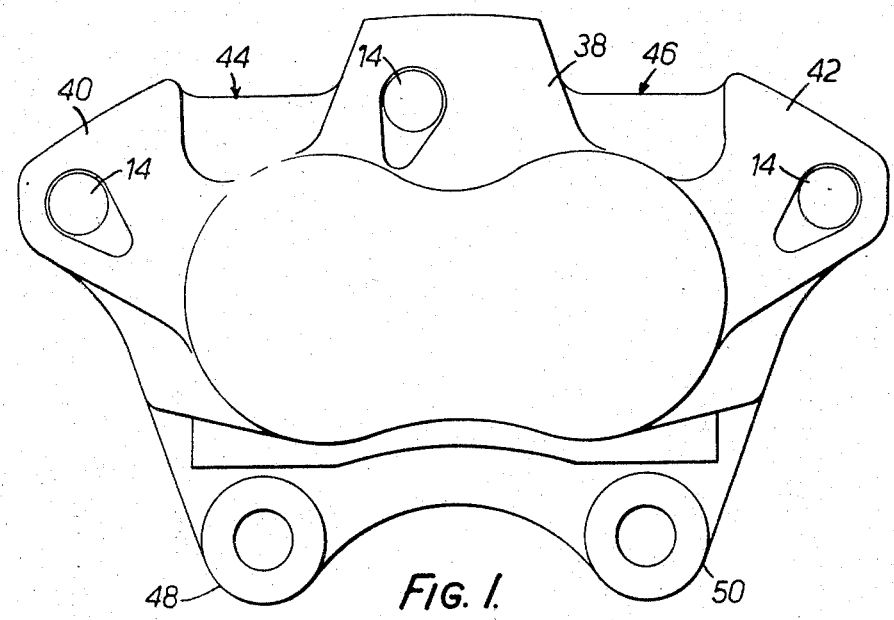
FIG. 1 is a view in elevation of the brake with the disc removed.
Figure 2:
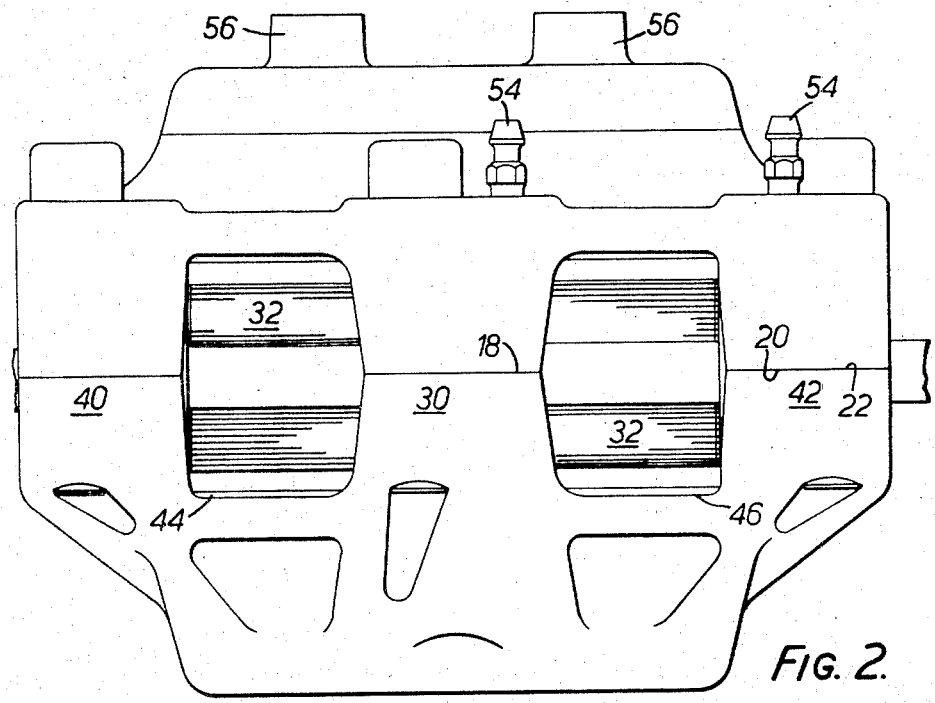
FIG. 2 is a plan view.

The brake caliper or housing is made up of two half castings 10 and 12 bolted together by connecting bolts 14 which pass through the bridge section of the caliper straddling the outer edge of the disc 16; the caliper having a split line 18 co-inciding with the center plane of the disc and defined by matching faces 20 and 22 on each of the caliper halves respectively.

Each caliper half carries a pair of spaced hydraulic cylinders 24 and 26 containing sealed and booted working pistons 28 and 30 for moving a friction pad assembly 32 into engagement with the disc. The pad assembly which is spigotted to the pistons for radial retention, is positioned between a pair of parallel plane abutment surfaces 34 which serve to guide the pad for axial movement and also as abutments preventing circumferential movement of the pad and absorbing the drag force during braking. Lugs 36, extending upwardly at each end of the backing plate which forms part of the pad assembly, enable the abutment surfaces to extend radially outside the disc area.

The caliper bridge section consists of a central portion 38 and flank portions 40 and 42 which between them define a pair of windows 44 and 46 for pad inspection purposes, and their size and spacing is such that the whole of the pad guiding surfaces 34 are also exposed to view.

One half 10 of the caliper is provided at its radially inner end with a pair of mounting lugs 48 and 50 which are positioned in line with the respective windows 44, 46. In each caliper half, the alignment of the guiding surfaces 34 with the respective windows 44, 46 enables these surfaces and the jointing surface 20 or 22 to be machined in a single pass with a rectilinear stroke of a cutting tool, e.g. by broaching or milling. Furthermore, in the case of caliper half 10, the inner surfaces 52 of the lugs 48 and 50 can be machined in the same pass.

The hydraulic cylinders are arranged in two opposed pairs (the actuation of either pair being sufficient to move the pads into engagement with the brake disc) and the two pairs are connected into two separate and independently operated groups of opposed pot actuators. The cylinders of each pair, lying on opposite sides of the caliper, are interconnected by internal drilling 53 passing across the bridge section. A bleed screw 54 is fitted at the sealed junction 55 of drilled holes as seen in FIG. 4 and hydraulic inlets 56 enter the cylinder 24 through the end wall of the cylinder.

Figure 3:
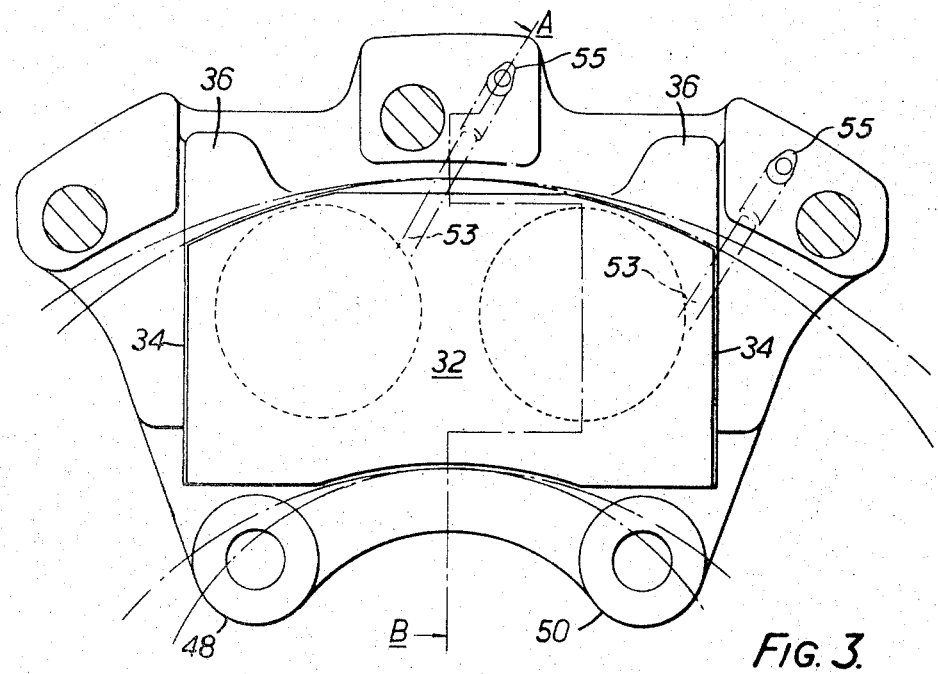
FIG. 3 is a view in elevation as in FIGS. 1 with part of the caliper removed.
Figure 4:
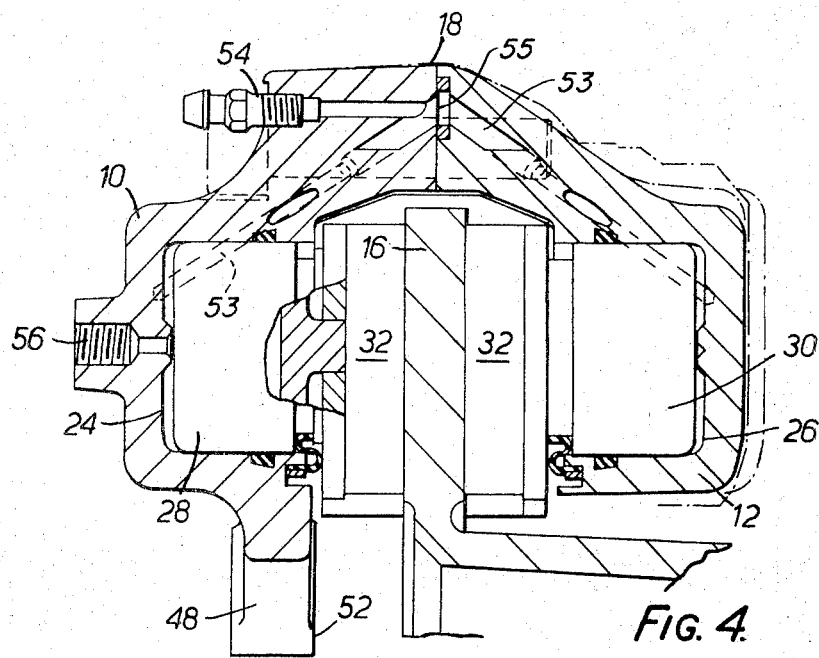
FIG. 4 is a sectional side view along the line A B in FIG. 3.

As clearly shown in FIGS. 3 and 4 the axes of the internal drillings 53 are slanted upwardly relative to the cylinders so that the sealed junctions of the drillings and the bleed screws 54 are above the respective pairs of cylinders whereby bubbles of air trapped in the cylinders travel to the high point of the passages in the bridge sections for ready bleeding through the ports. This situation will also prevail if the caliper of FIG. 3 is mounted in a position rotated 90° to the left in FIG. 3. If the caliper were mounted 90° to the right of FIG. 3, obviously the passages would be reversed so that the ones shown leading to the central and right hand bridge sections would then lead to the left hand and central bridge sections.

I claim:

1. A vehicle disc brake comprising a caliper structure formed in two opposed halves each having a mutually abutting joint surface parallel to the plane of the brake disc, said caliper structure including a bridge portion straddling the disc and divided into a central section and two circumferentially spaced side sections each defining with said central section a pad inspection window in said bridge portion, two side-by-side cylinders and pistons in each caliper half, each cylinder and piston being aligned with an opposed cylinder and piston in the other caliper half, and separate passage means interconnecting the two cylinders of each opposed pair and adapted to be independently connected with a source of fluid pressure, each of said passage means comprising a pair of internal drillings wholly within the caliper halves and arranged that when said caliper is in its position of use said drillings extend upwardly from the respective cylinders to respective sealed junctions at the abutting joint surface of each caliper half, one of said junctions being in said central bridge section and the other junction being in a side bridge section, and bleed screw means connected to both of said junctions.

2. The disc brake of claim 1 including pad guide surfaces in each of said caliper halves comprising a pair of plane surfaces lying parallel to one another and each aligned with a respective one of said windows, said windows being of a size to enable a cutting tool to simultaneously machine said guide surfaces and said joint surface of each caliper half in a single rectilinear pass of the cutting tool.

3. A brake in accordance with claim 2 wherein one of the halves of the caliper structure is formed at its radially inner end with at least one mounting lug having a machined face which lies in a plane parallel to the plane of the disc, whereby this face also can be machined in the same rectilinear cutting stroke as the pad guiding surfaces and the jointing surface of that caliper half.

* * * * *